(12) United States Patent
Diorio et al.

(10) Patent No.: US 8,593,257 B1
(45) Date of Patent: Nov. 26, 2013

(54) RFID-BASED LOSS-PREVENTION SYSTEM

(75) Inventors: Christopher J. Diorio, Shoreline, WA (US); Scott A. Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 382 days.

(21) Appl. No.: 12/890,628

(22) Filed: Sep. 25, 2010

Related U.S. Application Data

(60) Provisional application No. 61/354,659, filed on Jun. 14, 2010.

(51) Int. Cl.
*H04Q 5/22* (2006.01)
(52) U.S. Cl.
USPC ...... 340/10.1; 340/5.61; 340/10.51; 380/270; 713/176
(58) Field of Classification Search
USPC .......... 340/10.1, 10.51, 5.61, 572.1; 380/270; 713/176
See application file for complete search history.

(56) References Cited

U.S. PATENT DOCUMENTS

| | | | | |
|---|---|---|---|---|
| 7,327,216 | B2 * | 2/2008 | Ghabra et al. | 340/10.51 |
| 7,800,499 | B2 * | 9/2010 | Rehman | 340/10.51 |
| 2006/0181397 | A1 * | 8/2006 | Limbachiya | 340/10.51 |
| 2006/0230276 | A1 * | 10/2006 | Nochta | 713/176 |
| 2008/0150702 | A1 * | 6/2008 | Neill et al. | 340/10.42 |
| 2009/0160615 | A1 * | 6/2009 | O'Brien et al. | 340/10.1 |
| 2010/0308978 | A1 * | 12/2010 | Brown | 340/10.42 |

* cited by examiner

*Primary Examiner* — Thomas Mullen
(74) *Attorney, Agent, or Firm* — Turk IP Law, LLC

(57) ABSTRACT

In RFID systems employed for loss prevention, an item supplier or an ingress reader writes an ownership code associated with an organization or facility into a tag, indicating that an item to which the tag is attached is associated with the facility and not foreign. At checkout or point-of-sale an authorization reader writes a digital signature into the tag indicating that the tagged item is allowed to leave the facility. At point-of-exit an exit reader determines if the tagged item is allowed to leave the facility by verifying the ownership code and the digital signature. The loss-prevention system may issue an alert or sound an alarm if a facility-associated item is leaving the facility without a proper digital signature indicating that the item is approved to leave.

26 Claims, 10 Drawing Sheets

RFID-BASED LOSS-PREVENTION SYSTEM

CROSS REFERENCE TO RELATED APPLICATIONS

This application claims the benefit of U.S. Provisional Patent Application Ser. No. 61/354,659 filed on Jun. 14, 2010. The disclosures of the provisional patent application are hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a time, a destination, other attribute(s), any combination of attributes, and so on.

An RFID tag typically includes an antenna subsystem and a radio subsystem including a modem, a power management section, a logical section, and a memory. In some RFID tags the power management section includes an energy storage device such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

RFID technology may be employed in loss-prevention systems used, for example, by retailers. Point-of-Exit (PoE) readers deployed at store exits read tagged items exiting the store and determine if the item is approved to leave. However, the determination can be a challenging one. In one approach, a store database maintains information about all items in the store, and indicates if an item is approved to leave. The PoE reader then checks the database for approval. Unfortunately, implementing the database may be costly and/or complex, especially for large stores that contain a large number of items, multiple entrances and exits, and multiple Point-of-Sale or checkout registers (collectively, PoS) that must continually update the database.

In another approach, the tags themselves retain information about whether they are approved to leave the store, and the PoE reader checks each tag for approval. Authorization readers at PoS may write a bit or bits to each tag indicating that the item is approved to leave. Unfortunately, this approach is susceptible to thieves using unauthorized readers to illegitimately set the bit or bits, typically necessitating a password-based authorization system that is complicated to maintain and use and is itself susceptible to attack.

Finally, for both approaches, foreign tags entering a store (such as a tag carried by a consumer on his or her person) may further complicate the situation because the PoE reader must determine if a departing item is foreign or stolen.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID systems for loss prevention. An ownership code (OC) associated with an organization or facility is stored in the tag, indicating that an item to which the tag is attached is associated with the facility and not foreign (a foreign tag indicates an item not associated with the facility). An authorization reader writes a digital signature (DS) into the tag to indicate that the tagged item is allowed to leave the facility. The DS is based on information stored in the tag such as the tag's item identifier or other tag information (collectively an item identifier or II), and/or a temporal parameter (TP) based on a date and/or time (for example, a date and/or time of the authorization for the tagged item to be removed). The TP may have any numeric value such as the date itself, a number generated based on the date, a randomly generated number, or similar values. The DS is also based on a secret or private key associated with the facility. A PoE reader verifies that, for items whose OC is associated with the facility, the DS is legitimate or proper and therefore the item is approved to leave the facility.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
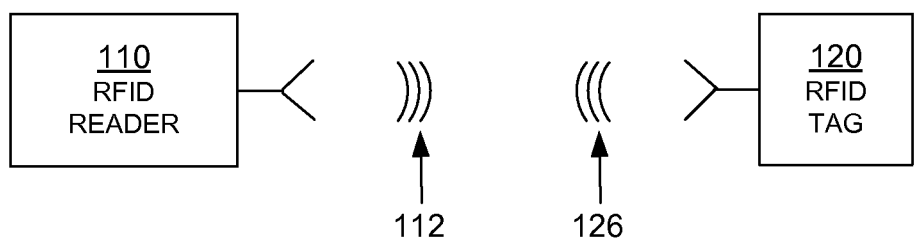
FIG. 1 is a block diagram of components of an RFID system.

FIG. 1 is a diagram of components of a typical RFID system 100, incorporating embodiments. An RFID reader 110 transmits an interrogating radio frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

RFID tag 120 can be a passive tag, or an active or battery-assisted tag (i.e., having its own power source). Where RFID tag 120 is a passive tag, it is powered from wave 112.

Figure 2:
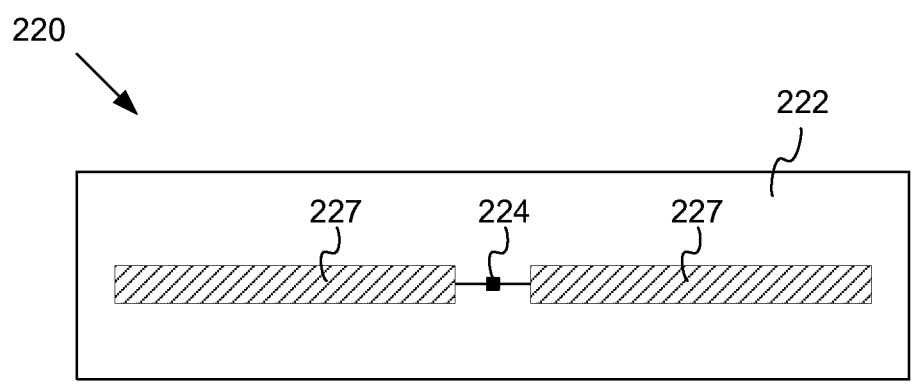
FIG. 2 is a diagram showing components of a passive RFID tag, such as a tag that can be used in the system of FIG. 1.

FIG. 2 is a diagram of an RFID tag 220, which can be the same as RFID tag 120 of FIG. 1. RFID tag 220 is implemented as a passive tag, meaning it does not have its own power source. Much of what is described in this document, however, applies also to active and battery-assisted tags.

RFID tag 220 is formed on a substantially planar inlay 222, which can be made in many ways known in the art. RFID tag 220 includes an electrical circuit which is preferably implemented as an IC 224. IC 224 is arranged on inlay 222.

RFID tag 220 also includes an antenna for exchanging wireless signals with its environment. The antenna is usually flat and attached to inlay 222. IC 224 is electrically coupled to the antenna via suitable antenna terminals (not shown in FIG. 2).

The antenna may be made in a number of ways, as discussed in more detail below. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna terminals of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
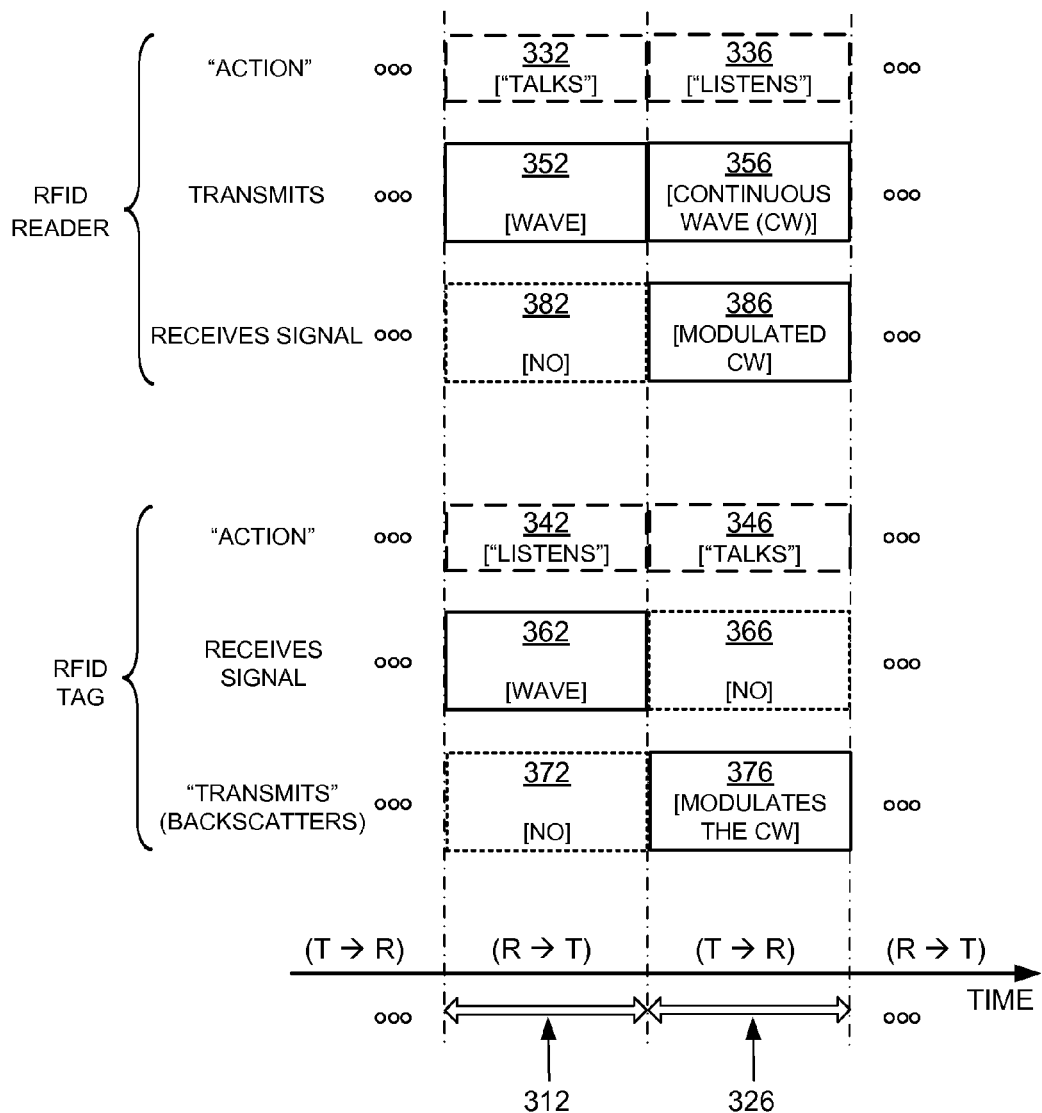
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when RFID reader 110 talks to RFID tag 120 the communication session is designated as "RT", and when RFID tag 120 talks to RFID reader 110 the communication session is designated as "TR". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while RFID reader 110 talks (during interval 312), and talks while RFID reader 110 listens (during interval 326).

In terms of actual technical behavior, during interval 312, RFID reader 110 talks to RFID tag 120 as follows. According to block 352, RFID reader 110 transmits wave 112, which was first described in FIG. 1. At the same time, according to block 362, RFID tag 120 receives wave 112 and processes it, to extract data and so on. Meanwhile, according to block 372, RFID tag 120 does not backscatter with its antenna, and according to block 382, RFID reader 110 has no wave to receive from RFID tag 120.

During interval 326, RFID tag 120 talks to RFID reader 110 as follows. According to block 356, RFID reader 110 transmits a Continuous Wave (CW), which can be thought of as a carrier signal that ideally encodes no information. As discussed before, this carrier signal serves both to be harvested by RFID tag 120 for its own internal power needs, and also as a wave that RFID tag 120 can backscatter. Indeed, during interval 326, according to block 366, RFID tag 120 does not receive a signal for processing. Instead, according to block 376, RFID tag 120 modulates the CW emitted according to block 356, so as to generate backscatter wave 126. Concurrently, according to block 386, RFID reader 110 receives backscatter wave 126 and processes it.

An order, a timing, and other parameters of RFID tag/reader communications may be defined by industry and/or government set standards. For example, Class-1 Generation-2 UHF RFID Protocol for Communications at 860 MHz-960 MHz ("Gen2 Protocol") by EPCglobal, Inc. is one such standard. Contents of Gen2 Specification version 1.2 are hereby incorporated by reference.

Figure 4:
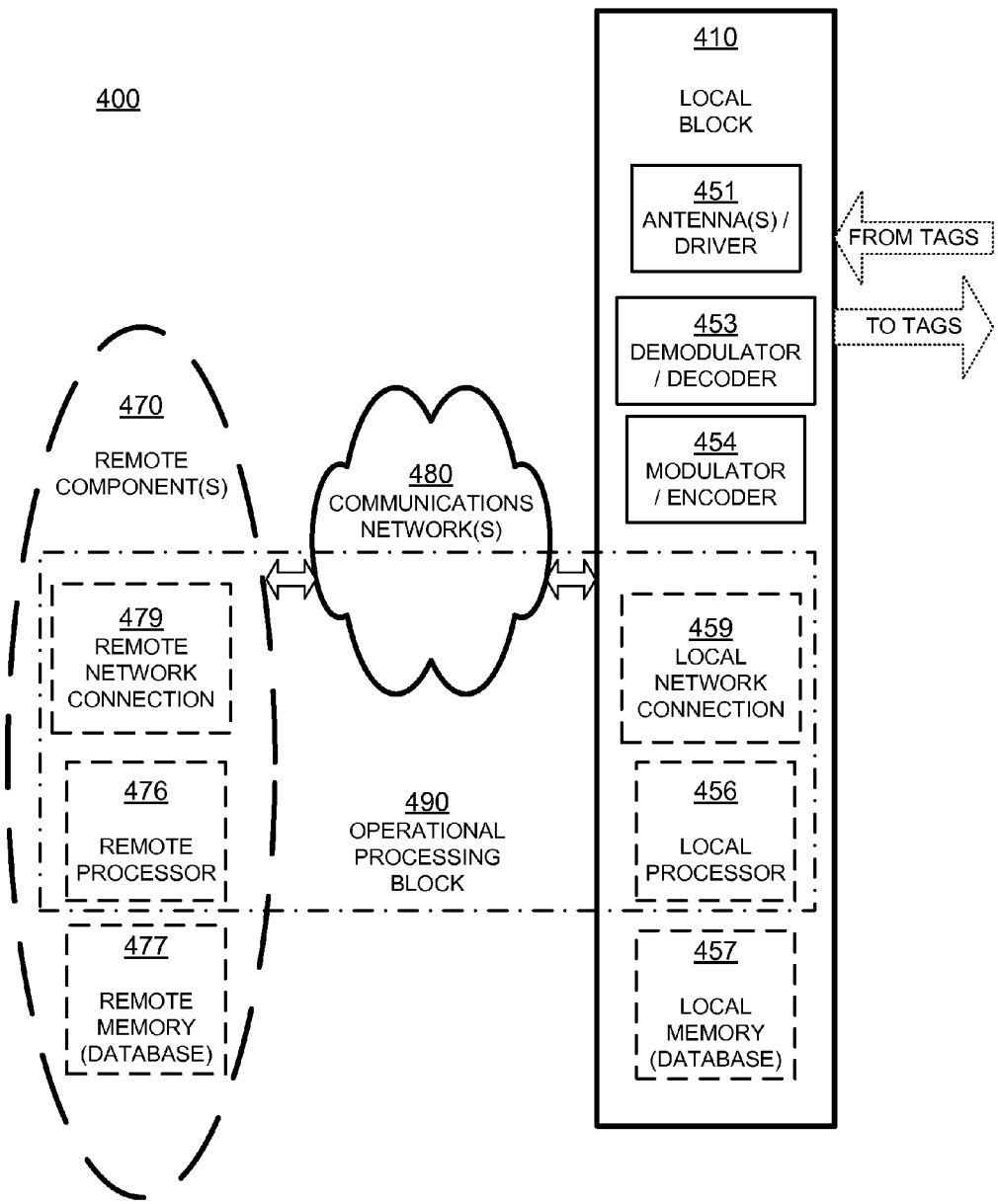
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented by RFID reader system 400 instead of the local block 410 shown in FIG. 4.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authorization function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in a single chip with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an encryption function, similar to local processor 456.

Remote component(s) 470 can also include a remote memory 477. Remote memory 477 can be made in any way known in the art, such as was described with reference to local memory 457. Remote memory 477 may include a local database, and a different database of a Standards Organization, such as one that can reference EPCs. Remote memory 477 may also contain information associated with command, tag profiles, keys, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
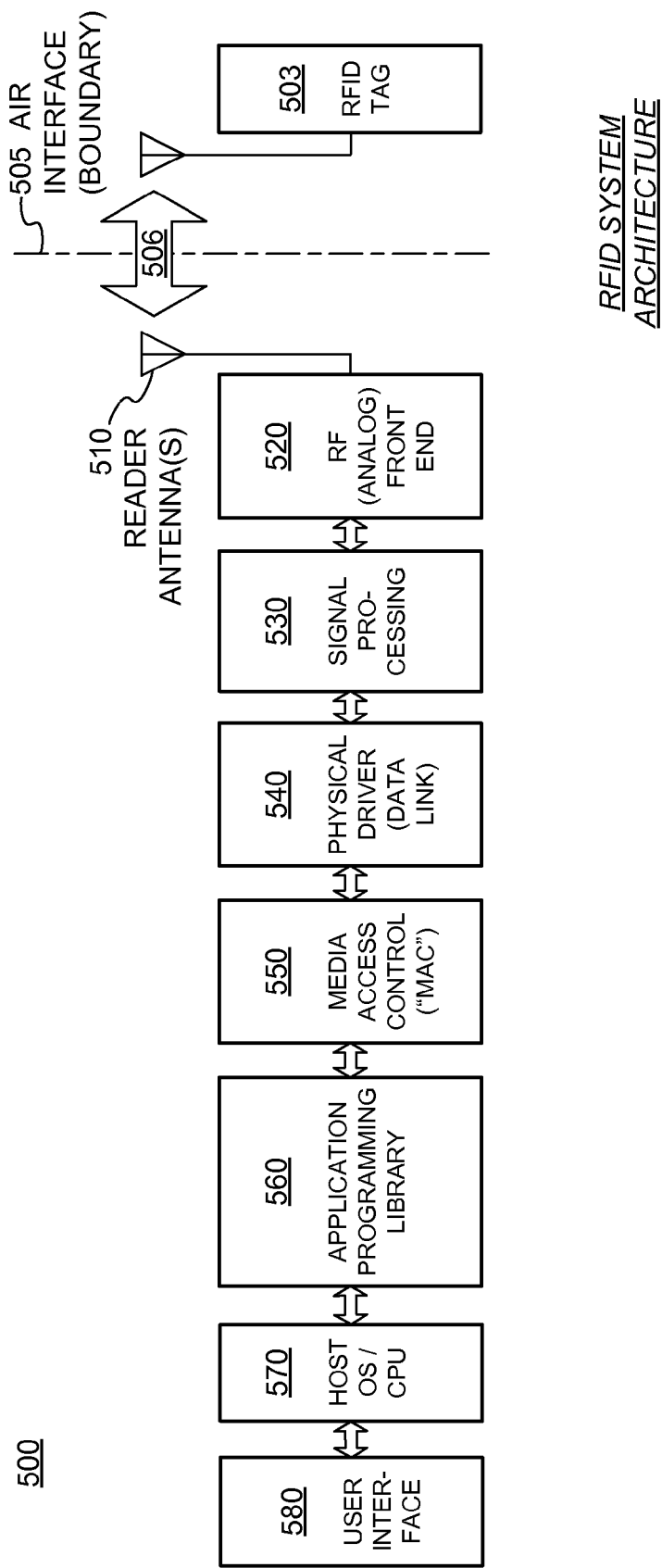
FIG. 5 is a block diagram illustrating an overall architecture of an RFID system according to embodiments.

FIG. 5 is a block diagram illustrating an overall architecture of an RFID reader 500 according to embodiments. It will be appreciated that RFID reader 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. RFID tag 503 conducts a wireless communication 506 with the reader, via the air interface 505. It is noteworthy that air interface 505 is really only a boundary, in that signals or data that pass through it are not intended to be transformed from one thing to another. Specifications as to how readers and tags are to communicate with each other, for example the Gen 2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550, which is also known as MAC layer module. In one embodiment, MAC layer module 550 exchanges packets of bits with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with calculating and/or writing an OC and/or a DS to the tag as part of a loss-prevention system.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular subdivision into modules need not be followed for creating embodiments. Furthermore, the features of the present disclosure can be performed either within a single one of the modules, or by a combination of them.

As mentioned previously, embodiments are directed to employing RFID readers and tags in a loss-prevention system. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 6:
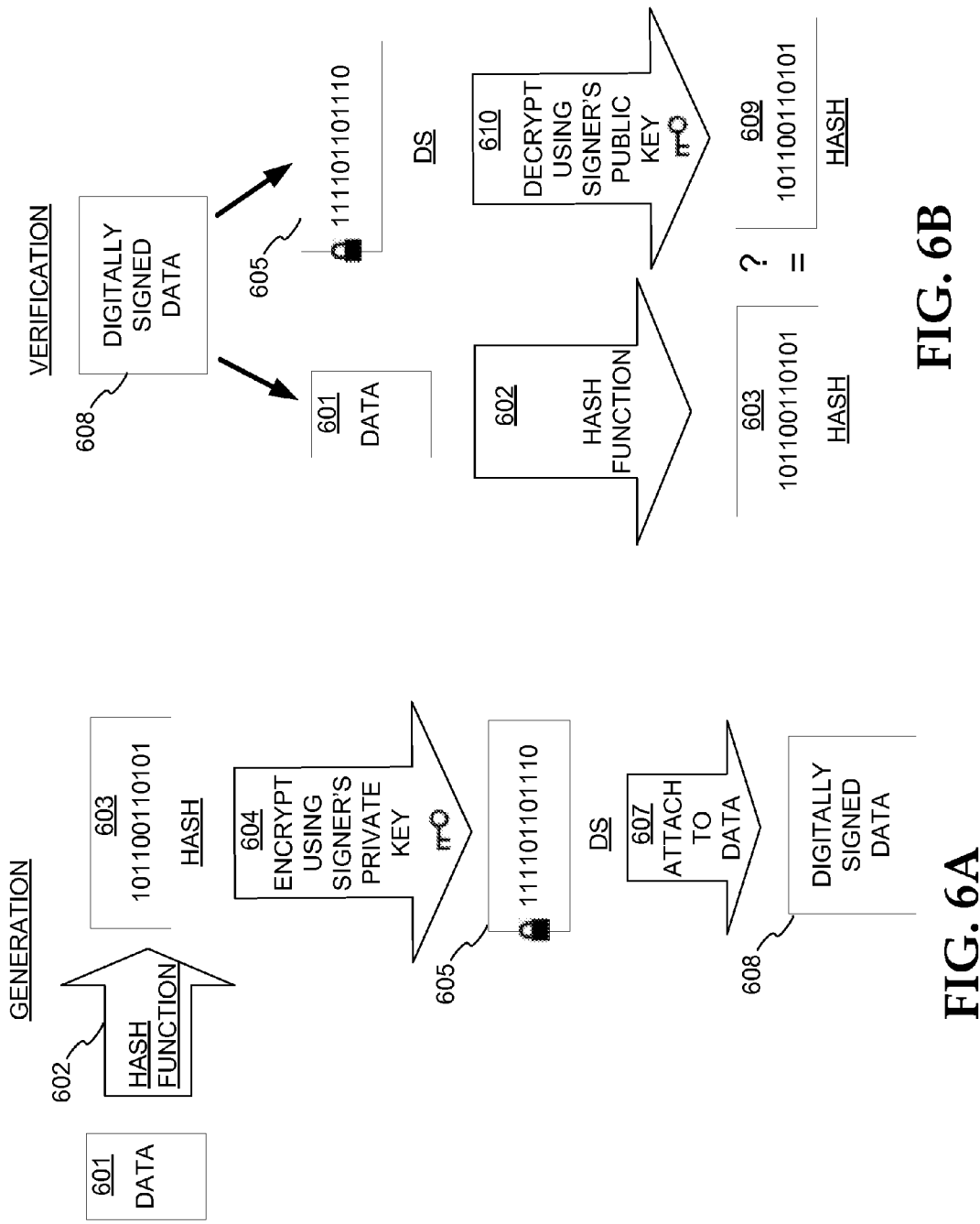
FIG. 6A is a flow diagram illustrating generating and writing a digital signature using a private key.
FIG. 6B is a flow diagram illustrating verifying a digital signature using a public key.

FIGS. 6A and 6B are flow diagrams illustrating generating and verifying a digital signature. Digital signatures allow verifying the authenticity and integrity of a digital message.

Digital signatures often employ asymmetric cryptography. A signatory, also referred to as a sender, possesses a private/public key pair where the private and public keys are mathematically related to each other. The sender uses the private key to generate the DS. A recipient uses the sender's public key to verify the DS. A verified DS gives the recipient reason to believe that the message was created by a known sender, and that it was not altered in transit.

FIG. 6A is a flow diagram illustrating an asymmetric method for generating a DS. A hash value 603 is derived from data 601 and hash function 602. The hash value 603 is encrypted using the signer's private key (604). The encrypted hash value is the DS 605. The DS 605 is attached to the data 601 to form digitally signed data 608.

FIG. 6B is a flow diagram illustrating an asymmetric method for verifying a DS. The digitally signed data 608 is split into two components, data 601 and DS 605. The hash value 603 is derived from data 601 and hash function 602. The DS 605 is decrypted using the signer's public key 610 to form decrypted hash 609. The hash value 603 is compared with the decrypted hash value 609. If the hash value 603 is equal to the decrypted hash value 609 then the DS 605 is considered verified or proper. A verified DS provides assurance that the data 601 was signed by the known sender and that the data has not been altered.

An important attribute of digital signatures is that they are difficult to forge or clone. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, Secure Hash Standard (SHS), specifies the hash functions to be used in conjunction with FIPS 186-1 and FIPS 186-3.

Figure 7:
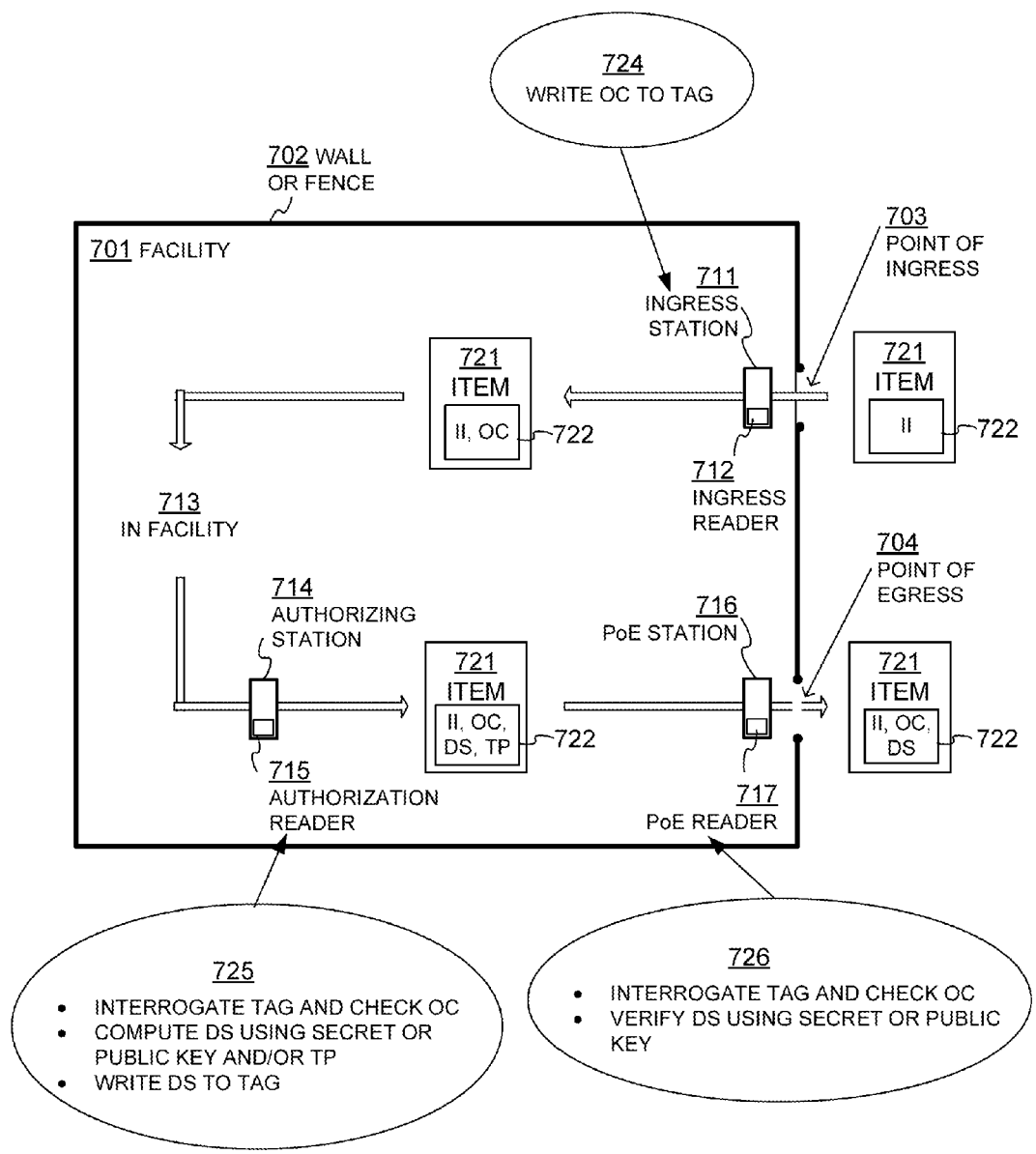
FIG. 7 is a conceptual diagram displaying authorization and exit verification.

FIG. 7 is a conceptual diagram illustrating an exemplary RFID-based loss-prevention system. Facility 701 may be a building or yard such as a retail store, a laboratory, a warehouse, a construction facility, or similar. Facility 701 is typically enclosed by a wall or fence 702. An RFID-based loss-prevention system according to embodiments restricts unauthorized items from leaving facility 701 while allowing foreign items (items not owned by the facility) to be brought in and removed freely.

Item 721 is typically delivered to facility 701 with a tag 722 having a preprogrammed II. In some embodiments tag 722 may arrive pre-preprogrammed with both an II and an OC. In other embodiments item 721 may be delivered without tag 722, and a tag 722 is programmed with an II and an OC and attached to item 721 in the facility. In yet other embodiments item 721 may be delivered with a blank or unprogrammed tag 722, leaving the II and OC to be programmed within the facility. Regardless of the tagging approach, item 721 enters point-of-ingress 703. An optional ingress station 711 including an ingress reader 712 reads tag 722 and, if the tag is lacking an II or OC, writes them into the tag at operation 724. Note that ingress station 711 can be located anywhere in facility 701; can be outside the facility; can be a separate facility which performs tag encoding, or could even be a mobile reader such as a handheld device. Regardless of the methodology, after ingress and encoding the tagged item, containing an II and OC, will be at location 713—in the facility.

Items must be authorized to leave the facility. The authorization process is performed at authorization station 714 using authorization reader 715. As described in process 725, authorization reader 715 interrogates tag 722 attached to item 721, confirms that the OC is associated with facility 701, computes a DS using the facility's secret or private key, and writes the DS into the tag. In some embodiments the DS may be computed at least in part from the tag's II. In other embodiments the DS may be computed at least in part from a TP. In some embodiments authorizing reader 715 writes the TP into tag memory. In yet other embodiments the DS may be computed from the II and from the TP. A tag 722 with a proper DS is authorized to leave the facility. As described above, a DS may be derived using a secret key and a symmetric-key cryptographic algorithm like AES, or using a private key and an asymmetric-key cryptographic algorithm like DSA.

At the facility point-of-egress 704, a PoE reader 717 located at PoE station 716 interrogates the tag and reads its OC, DS, and optionally its TP and/or II. As described at operation 726, the PoE reader checks the tag's OC and if the item is associated with the facility then the PoE reader verifies that the DS is proper. PoE reader 717 may verify the DS using the facility's secret for symmetric cryptosystems or using the facility's public key for asymmetric cryptosystems. If the DS is proper then item 721 may be removed through point of egress 704. If the DS is not proper then PoE station 716 may sound an alarm or otherwise notify authorities that an unauthorized item is departing the facility. Points of ingress and egress 703 and 704 may include doors, doorways, hallways, ramps, garages, and similar.

Figure 8:
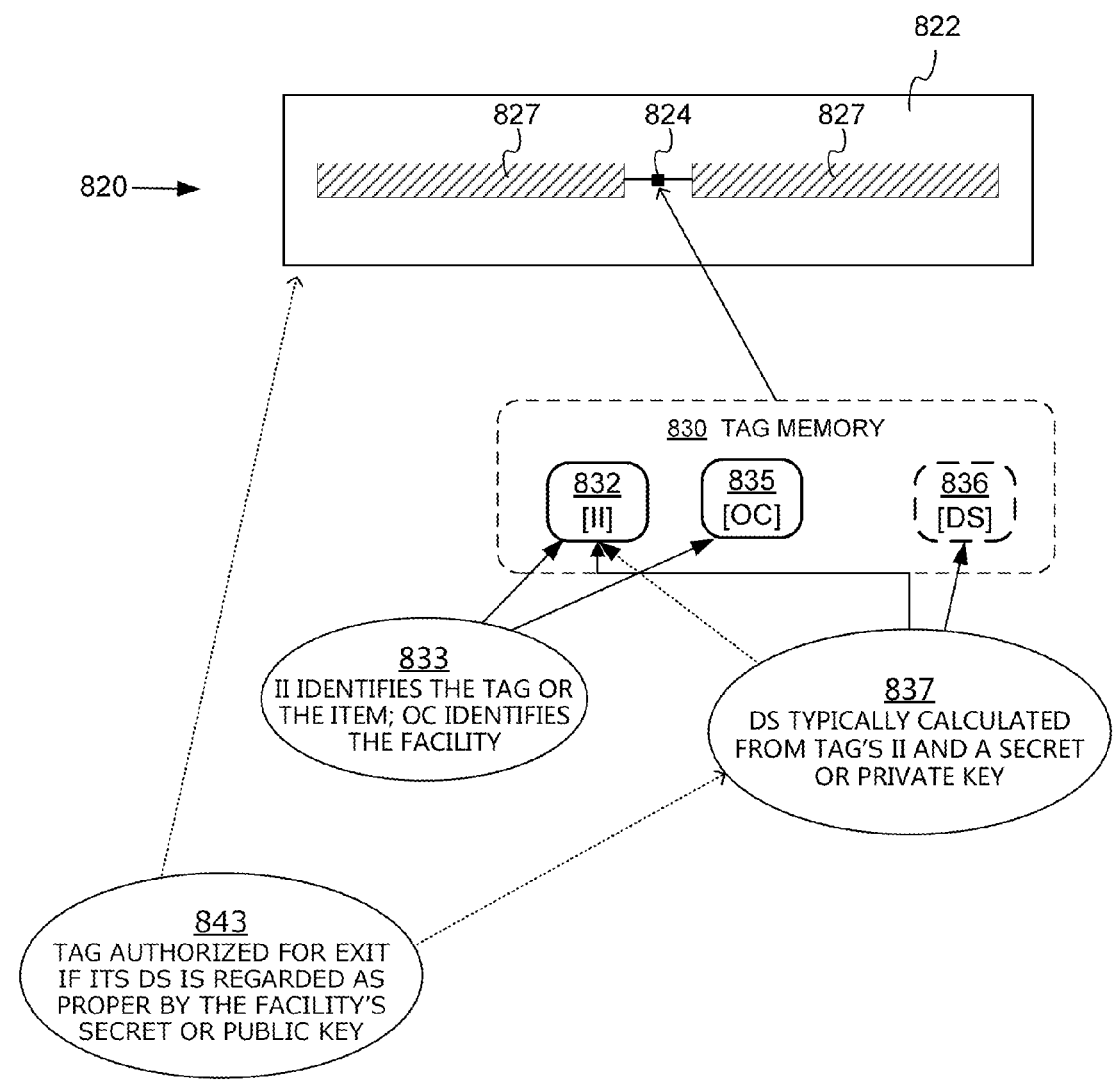
FIG. 8 illustrates major components of an RFID tag and how item identifier, ownership code, and digital signature are stored in a tag according to embodiments.

FIG. 8 illustrates an RFID tag 820 storing an II, OC, and DS in tag memory. As discussed previously, RFID tag 820 includes IC 824 and antenna(s) 827 on inlay 822. IC 824 includes a tag memory 830 which may be flat or partitioned into sections. In a system according to embodiments, an II 832, OC 835, and a DS 836 may be stored in the same or different sections of tag memory 830. In some embodiments a TP may also be stored in tag memory (not shown in FIG. 8).

As indicated by comment 833, II 832 identifies the item to which the tag is attached. II 832 may be a tag identifier (TID), an electronic product code (EPC), a unique item identifier (UII), a serialized global trade item number (SGTIN), or similar. Also as indicated by comment 833, OC 835 identifies the facility, a parent of the facility, an organization associated with the facility, a manufacturer, a retail seller, etc. with which the item is associated. As indicated by comment 837, DS 836 is often calculated from II 832 and a facility's secret or private key.

As indicated by comment 843, RFID tag 820 (and, by association, the item attached to RFID tag 820) may be considered authorized for removal from the facility if DS 836 is regarded as proper by the facility's secret or public key. The secret or private/public key pair may be managed or assigned by the facility, a parent of the facility, an organization associated with the facility, a security agency or organization, or similar. Of course, as described above, if OC 835 of RFID tag 820 does not match the facility's OC, or if OC 835 does not exist, then RFID tag 820 (and, by association, the item attached to RFID tag 820) may be considered to be not associated with the facility and therefore authorized for removal from the facility regardless of the DS value. To inhibit the unauthorized removal of items, II 832 and OC 835 may be write-locked or permanently write-locked and thereby rendered unchangeable. According to some embodiments, DS 836 may be unlocked or permanently unlocked to facilitate erasure or overwriting for items returned to the facility.

Figure 9A:
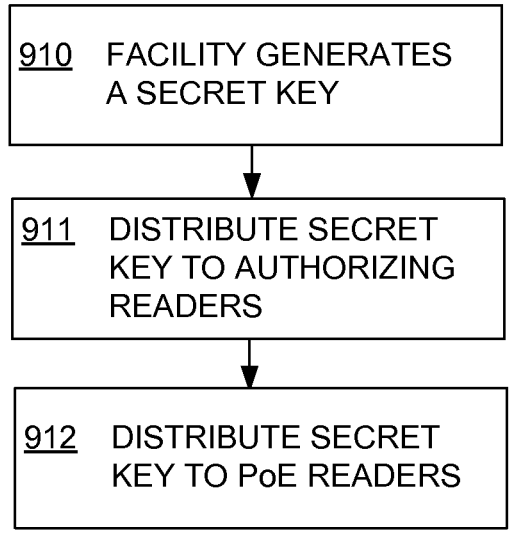
FIG. 9A is a flowchart for a process of generating and distributing secret keys.

FIG. 9A is a flowchart for a process of generating and distributing secret keys, such as may be used for symmetric cryptosystems. Process 900 begins at operation 910 with the facility generating a secret key. The secret key may be generated by an authority such as a security official or a government agency, by a computer system, or by any other means as will be well known to those skilled in the art. At operation 911 the secret key is provided to authorizing readers within the facility. At operation 912 the secret key is provided to PoE readers within the facility. The providing can be by a computer network such as network 480 of FIG. 4, or by any other means.

Figure 9B:
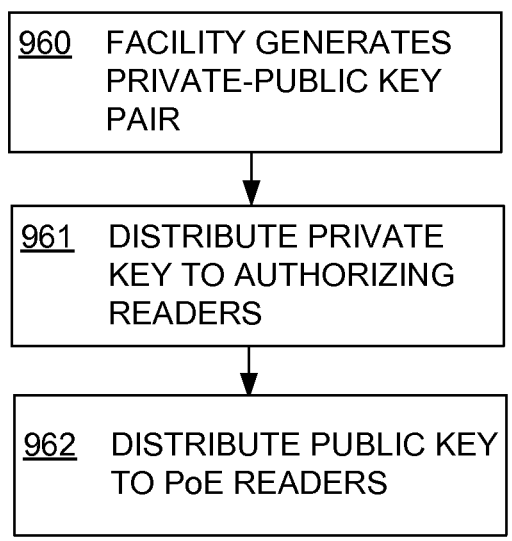
FIG. 9B is a flowchart for a process of generating and distributing private-public key pairs.

FIG. 9B is a flowchart for a process of generating and distributing public-private key pairs, such as may be used for symmetric cryptosystems. Process 950 begins at operation 960 with the facility generating a key pair. The key pair may be generated by an authority such as a security official or a government agency, by a computer system, or by any other means as will be well known to those skilled in the art. At operation 961 the private key is provided to authorizing readers within the facility. At operation 962 the public key is provided to PoE readers within the facility. The providing can be by a computer network such as network 480 of FIG. 4, or by any other means.

Figure 10:
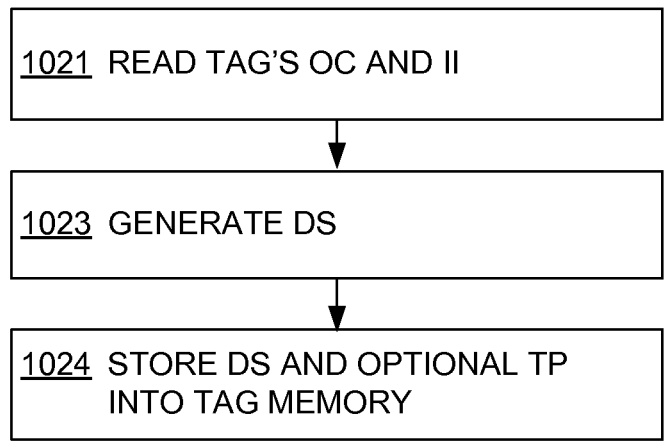
FIG. 10 is a flowchart for a process of storing a digital signature in a tag's memory.

FIG. 10 is a flowchart for a process of storing a DS and an optional TP in tag memory. Process 1000, which may be performed by an authorization reader, begins with operation 1021 where the authorization reader reads the tag's OC and/or II. If the OC does not match the facility's OC or does not exist then the tag may be considered foreign and exempted from the authorization process. At operation 1023 the authorization reader generates the DS, typically based on the II, the TP, or both the II and the TP. Of course, the terms "II" and "TP" are not to be taken literally—for convenience this document assumes the typical use case and denotes a number related to the item as an II, and a temporally variable number generated by the reader system as a TP, but any similarly derived or generated numbers can be equally acceptable (such as a random number or a time-varying number as the TP). As described above, the DS is also based on a secret or private key associated with the facility. Of course, the DS may be generated remotely rather than in the authorization reader, such as by remote components 470 of FIG. 4, and provided to the authorization reader. At operation 1024 the authorization reader stores the DS and optional TP into tag memory.

Figure 11:
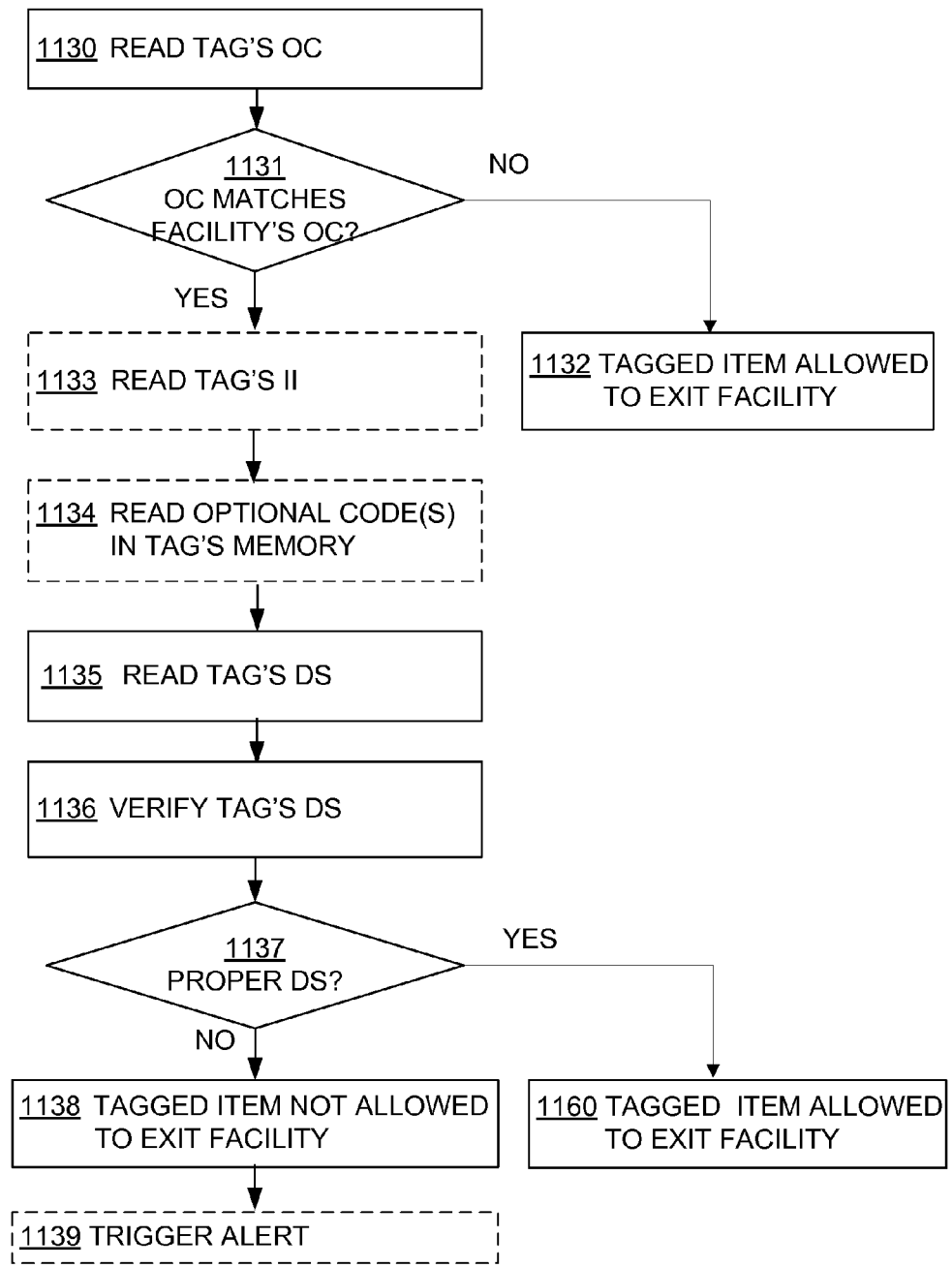
FIG. 11 is a flowchart illustrating a verification process for an RFID-based loss-prevention system.

FIG. 11 is a flowchart illustrating a verification process for an RFID-based loss-prevention system. Process 1100 may be implemented by a PoE reader.

Process 1100 begins with operation 1130, where the reader reads a tag's OC. At optional decision operation 1131, the reader determines whether the tag's OC matches the facility's OC. If the tag's OC does not match the facility's OC or does not exist then the tagged item is allowed to leave the facility at operation 1132. If the tag's OC matches the facility's OC then the PoE reader may read the tag's II at optional operation 1133, and may read optional code(s) such as tag feature information or the TP at optional operation 1134. At operation 1135 the reader reads the tag's DS. At operation 1136 the reader verifies the DS, using a process like that of FIG. 6B. At decision operation 1137, if the PoE reader finds the DS to be proper then the tagged item is allowed to leave the facility at operation 1160. If the PoE reader finds the DS to be improper then the tagged item is not allowed to leave the facility at operation 1138. One method for preventing an item with an improper DS from leaving a facility is by triggering an alert or alarm, such as at optional operation 1139. Although this document describes the reader operations as proceeding serially, those skilled in the art will recognize that in any deployed RFID system one or more of these operations may be merged (for example, the authorization reader may read the tag's II, OC, DS, and TP all at once).

The operations described in processes 900, 1000 and 1100 are for illustration purposes only. An RFID-based loss-prevention system and its operations may be implemented employing additional or fewer operations and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID)-based loss-prevention system comprising:
    a first RFID reader configured to write an item identifier (II) to an RFID tag attached to an item, if the II is lacking from the RFID tag, and to write an ownership code (OC) to the RFID tag attached to the item, if the OC is lacking from the RFID tag;
    a second RFID reader configured to write a digital signature (DS) to the RFID tag authorizing the item to be removed from a facility, wherein the DS is derived in part from one of a secret key and a private key associated with the facility; and
    a third RFID reader configured to verify the DS at an exit location of the facility if the OC is associated with the facility.

2. The RFID system of claim 1, wherein the DS is derived in part from at least one of the II and a temporal parameter (TP).

3. The RFID system of claim 2, wherein the TP is stored in a memory of the tag.

4. The RFID system of claim 2, wherein tag memory locations storing one or more of the DS and the TP are write unlocked.

5. The RFID system of claim 1, wherein at least two of the first, second, and third readers are integrated into a single reader.

6. The RFID system of claim 1, wherein the second reader is configured to write the DS to the RFID tag upon verifying the II and the OC.

7. The RFID system of claim 1, wherein the DS is derived through one of symmetric and asymmetric cryptography.

8. The RFID system of claim 1, wherein the private key is paired with a public key associated with the facility.

9. The RFID system of claim 8, wherein the private key is distributed to the second reader and the public key is distributed to the third reader.

10. The RFID system of claim 1, wherein the secret key is distributed to the second and third readers.

11. The RFID system of claim 1, wherein the third reader is further configured to activate an alarm in response to detecting a tag without a valid DS being removed from the facility.

12. The RFID system of claim 1, wherein the II is one of a tag identifier, an electronic product code (EPC), a unique item identifier (UR), and a serialized global trade item number (SGTIN).

13. The RFID system of claim 1, wherein tag memory locations storing the II and the OC are write locked.

14. The RFID system of claim 1, wherein the OC indicates that at least one of the facility, a parent of the facility, a manufacturer, and an owner owns the item.

15. The RFID system of claim 1, wherein the third reader is at an exit location, the exit location being one of: a doorway, a hallway, a ramp, and a garage.

16. A method for implementing a Radio Frequency Identification (RFID)-based loss-prevention system, the method comprising:
    attaching an RFID tag to an item;
    writing an item identifier (II) to the RFID tag;
    writing an ownership code (OC) to the RFID tag;
    deriving a digital signature (DS) in part from one of a secret key and a private key associated with a facility;

writing the DS to the RFID tag to convey authorization for removal of the item from the facility; and verifying the DS at an exit location of the facility if the OC is associated with the facility.

17. The method of claim 16, further comprising deriving the DS in part from one of the II and a temporal parameter (TP).

18. The method of claim 17, further comprising writing the TP into a memory of the tag.

19. The method of claim 17, further comprising transmitting at least one of the II and the OC over a network and receiving at least one of the DS and the TP in response.

20. The method of claim 16, wherein the DS is written to the RFID tag upon verifying at least one of the II and the OC.

21. The method of claim 16, wherein the private key is paired with a public key used to verify the DS at the exit location.

22. The method of claim 16, further comprising activating an alarm in response to detecting a tag without a valid DS being removed from the facility.

23. The method of claim 16, further comprising storing the one of a secret key and a private key in a reader that writes the DS to the RFID tag.

24. The method of claim 16, further comprising:
reading at least the II from the RFID tag;
obtaining the DS;
then writing the DS to the RFID tag.

25. A method for implementing a Radio Frequency Identification (RFID)-based loss-prevention system, the method comprising:
attaching an RFID tag to an item;
writing an item identifier (II) to the RFID tag;
writing an ownership code (OC) to the RFID tag;
deriving a digital signature (DS) in part from a temporal parameter (TP) and one of a secret key and a private key associated with a facility;
writing the DS and the TP to the RFID tag to convey authorization for removal of the item from the facility; and
verifying the DS from at least the TP if the OC is associated with the facility.

26. The method of claim 25, wherein the TP is a time-varying number.

* * * * *